(12) United States Patent
Liu et al.

(10) Patent No.: US 8,159,844 B2
(45) Date of Patent: Apr. 17, 2012

(54) FULL-WAVE RECTIFYING DEVICE

(75) Inventors: Chi-En Liu, Taipei (TW); Jean-Fu Kiang, Taipei (TW)

(73) Assignee: National Taiwan University, Taipei (TW)

( * ) Notice: Subject to any disclaimer, the term of this patent is extended or adjusted under 35 U.S.C. 154(b) by 789 days.

(21) Appl. No.: 12/259,786

(22) Filed: Oct. 28, 2008

(65) Prior Publication Data

US 2009/0268497 A1 Oct. 29, 2009

(30) Foreign Application Priority Data

Apr. 25, 2008 (TW) .............................. 97115199 A

(51) Int. Cl.
H02M 7/08 (2006.01)
(52) U.S. Cl. .......................................... 363/70; 363/44
(58) Field of Classification Search ............... 363/65, 363/67, 69, 70, 44, 45, 125, 127
See application file for complete search history.

(56) References Cited

U.S. PATENT DOCUMENTS

| 6,181,602 B1 * | 1/2001 | Campardo et al. ....... 365/185.21 |
| 7,843,709 B2 * | 11/2010 | Umeda et al. .................... 363/44 |
| 2008/0030268 A1 * | 2/2008 | Quilter ........................... 330/10 |

* cited by examiner

Primary Examiner — Harry Behm
Assistant Examiner — Matthew Grubb

(57) ABSTRACT

A full-wave rectifying device includes a first rectification module and a second rectification module. The first rectification module includes one or a plurality of first rectification units. The second rectification module includes one or a plurality of second rectification units. In each of a plurality of transistors, the substrate is connected to the source so as to reduce the body effect of the rectifying circuit efficiently and enable generation of a dc voltage signal through rectification by a plurality of capacitors. A multistage rectifying circuit architecture including a plurality of first rectification units and second rectification units is provided, so as to reduce the body effect of transistors of a conventional rectifier and significantly stabilize the voltage output level, thereby allowing the rectifying circuit to generate a dc voltage level of designed value.

14 Claims, 7 Drawing Sheets

FULL-WAVE RECTIFYING DEVICE

BACKGROUND OF THE INVENTION

1. Field of the Invention:

The present invention relates to a full-wave rectifying device. More specifically this invention relates to a transistor full-wave rectifying device.

2. Description of Related Art:

Radio-Frequency Identification (RFID) System is an automatic identification method that involves affixing a small electronic tag to a product which may be checked and monitored by a device known as "reader" which in turn transmits the data stored in the electronic tag back to the system via a wireless RF means, thus achieving remote authentication, tracking, control, management and handling.

The electronic tags are categorized into two general varieties, passive and active. In particular, passive RFID tags have no internal power supply. The minute electrical current induced in the antenna by the incoming radio-frequency (RF) signal provides just enough power for the CMOS integrated circuit in the tag to power up and transmit a response.

Generally, the amplitude of the RF signal is approximately 200 mV or lower, and it is not easy to power up passive RFID tags with such a weak signal. Moreover, current leakage or parasitic effect often occurs in electrical circuits, thereby causing the RF signal energy to be further dissipated.

Consequently, a rectifier is designed such that, upon receiving the RF signal by the antenna of passive RFID tags, the capacitors are charged repeatedly, thereby converting the RF signal to a sufficient dc voltage level for the next stage of circuit operation.

Referring to FIG. 1, the first conventional full-wave rectifying circuit structure is shown. The full-wave rectifying circuit has eight transistors, P1-P6, N1 and N2. Such a circuit structure lowers the transistor body effect, thus improving the efficiency of converting the RF signal to a dc voltage.

However, such a circuit structure is only a single-stage rectifying circuit, which produces the dc voltage output that is approximately the amplitude of the RF signal only. Even under the circumstance of 100% conversion efficiency, such a circuit structure usually fails to provide a sufficient dc voltage level.

Referring to FIG. 2, another conventional full wave rectifying circuit structure is illustrated. Diode-connected transistor instead of Schottky diode is used in the cascade of a multistage rectifying circuit, thereby deriving a sufficient dc voltage level given a specified input power.

However, the chip manufacturing process of such a circuit structure does not take into account the importance of separate bulk connection which suppresses the body effect. Hence, such a circuit may be affected by the body effect, thus causing a significant difference in the threshold voltage of the transistor at each stage. Consequently, the output voltage level is lowered and the circuit fails to output a dc voltage level that matches the designed value.

In summary, it has become an urgent issue to designers of the RF circuit design field to propose a multistage full-wave rectifying circuit that not only provides a sufficient dc voltage level, but also avoids or lowers the body effect such that the difference in the threshold voltage of the transistor at each stage is reduced to minimum, in order for the circuit successfully to output a dc voltage level that matches the designed value.

SUMMARY OF THE INVENTION

In view of the above disadvantages of the conventional techniques, it is a primary objective of the present invention to provide a full-wave rectifying device that supplies a sufficient dc voltage level and avoids or lowers the body effect such that the difference in the threshold voltage of the transistor at each stage is reduced to minimum, in order for the circuit successfully to output a dc voltage level that matches the designed value.

In order to achieve the above-mentioned objective, the present invention provides a full-wave rectifying device that has a first rectification unit having a first transistor and a second transistor, a second rectification unit having a third transistor and a fourth transistor, and a plurality of capacitors. In particular, the source of each transistor is connected to the substrate and the drain is connected to the gate; by connecting the source of the transistor to the substrate, the body effect in the rectifying circuit is effectively lowered.

In addition, the first transistor is connected in series with the second transistor, between which a capacitor is connected. The third transistor is connected in series with the fourth transistor, between which a capacitor is connected. Furthermore, the first rectification unit is connected to the second rectification unit to form a symmetrical full-wave rectifying circuit.

Finally, the symmetrical full-wave rectifying circuit is connected to a signal input unit, a ground terminal and a load, thereby allowing the signal input unit to receive the RF signal fed from the external environment. The first rectification unit and the second rectification unit in turn convert the RF signal to a rectified dc voltage level.

In order to achieve the aforementioned objective, the present invention provides another full-wave rectification device, which has a first rectification module, a second rectification module and a plurality of capacitors. In particular, the first rectification module includes two first rectification units, and each of the first rectification unit further includes a first transistor and a second transistor. As well, the second rectification module has two second rectification units, and each of the second rectification units further includes a third transistor and a fourth transistor. In addition, the source of each of the transistors is connected to the substrate, and the drain is connected to the gate. Hence, the body effect in the rectifying circuit is effectively lowered by employing the method of connecting the source of the transistor to its substrate.

Also, the first transistor of each of the first rectification units is cascaded with the second transistor between which a capacitor is connected. As well, the third transistor of each of the second rectification units is cascaded with the fourth transistor between which a capacitor is connected.

Subsequently, the first first rectification unit is connected to the second first rectification unit to form a first rectification module; similarly, the first second rectification unit is connected to the second second rectification unit to form a second rectification module. Furthermore, the first rectification module is connected to the second rectification module to form a symmetrical two-stage full-wave rectifying circuit.

Finally, the symmetrical two-stage full wave rectifying circuit is connected to a signal input unit, a ground terminal and a load, thereby allowing the signal input unit to receive the RF signal fed from the external environment. The first rectification module and the second rectification module in turn convert the RF signal to a rectified dc voltage level.

In order to achieve the above-mentioned objective, the present invention also provides another full-wave rectifier, which includes a first rectification module, a second rectification module and a plurality of capacitors. In particular, the first rectification module has a plurality of first rectification units, and each of the first rectification unit further includes a first transistor and a second transistor. As well, the second rectification module has a plurality of second rectification units, and each of the second rectification units further includes a third transistor and a fourth transistor. In addition, the source of each of the transistors is connected to the substrate and the drain is connected to the gate. The body effect in the rectifying circuit is effectively lowered by employing the method of connecting the source of the transistor to its substrate.

Also, the first transistor of each of the first rectification units is cascaded with the second transistor between which a capacitor is connected. As well, the third transistor of each of the second rectification units is cascaded with the fourth transistor between which a capacitor is connected.

Subsequently, the $(N-1)^{st}$ first rectification unit is connected to the $N^{th}$ first rectification unit to form a first rectification module; similarly, the $(N-1)^{st}$ second rectification unit is connected to the $N^{th}$ second rectification unit to form a second rectification module. Furthermore, the first rectification module is connected to the second rectification module to form a symmetrical N-stage full-wave rectifying circuit.

Finally, the symmetrical N-stage full-wave rectifying circuit is connected to a signal input unit, a ground terminal and a load, thereby allowing the signal input unit to receive the RF signal fed from the external environment. The first rectification module and the second rectification module in turn convert the RF signal to a rectified dc voltage level.

In summary, the full-wave rectifying device of the present invention employs the method of connecting the source of each transistor to the substrate in order to effectively lower the body effect in the rectifying circuit. Next, a plurality of capacitors are used to generate a rectified dc voltage level. Besides the present invention also discloses a multistage rectifying circuit design that employs a plurality of first rectification units and a plurality of second rectification units, so as to increase the rectified dc voltage level to a sufficient level.

As a result, the above-mentioned multistage full-wave rectifying circuit designed using transistors not only lowers the body effect of transistors in the conventional rectifier, but also significantly increases the rectified dc voltage level to a level that matches the designed value.

DETAILED DESCRIPTION OF PREFERRED EMBODIMENTS

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

The following embodiments further illustrate the points of the present invention in detail, however the scope of the invention is not limited to any points.

FIRST EMBODIMENT

Figure 1:
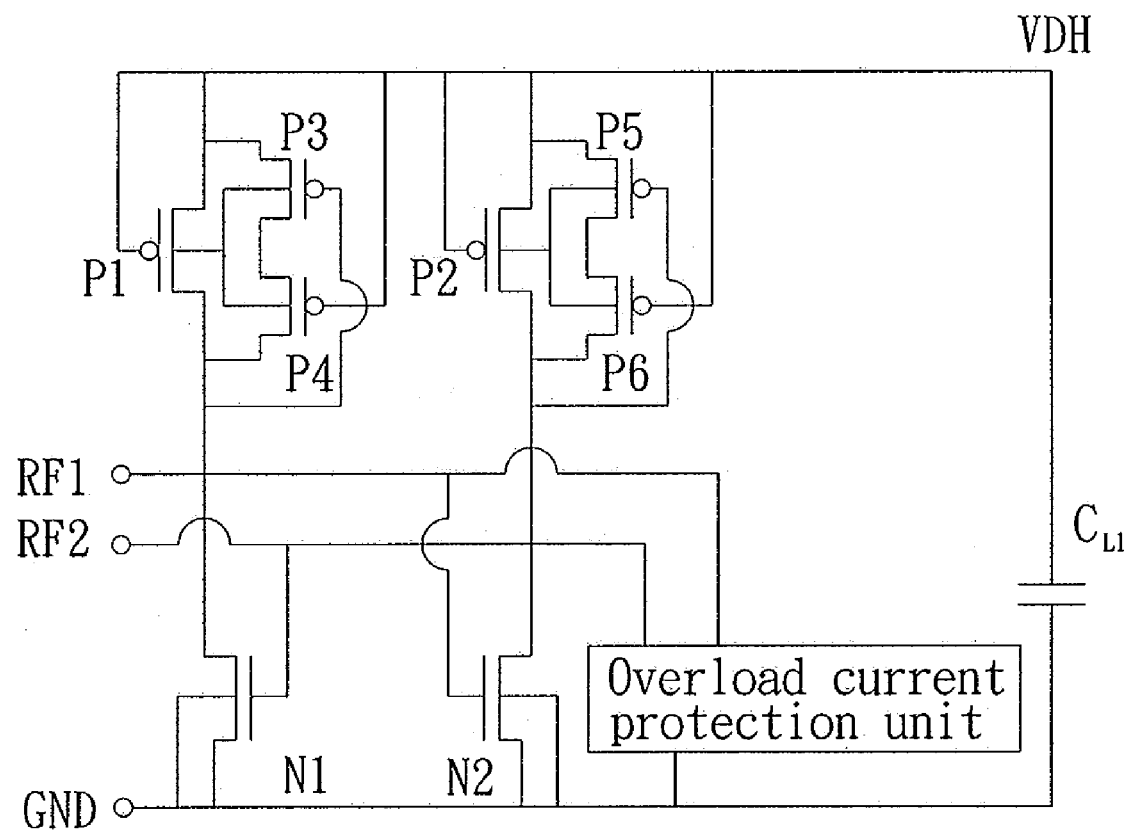
FIG. 1 illustrates a first conventional full-wave rectifying circuit structure.
Figure 2:
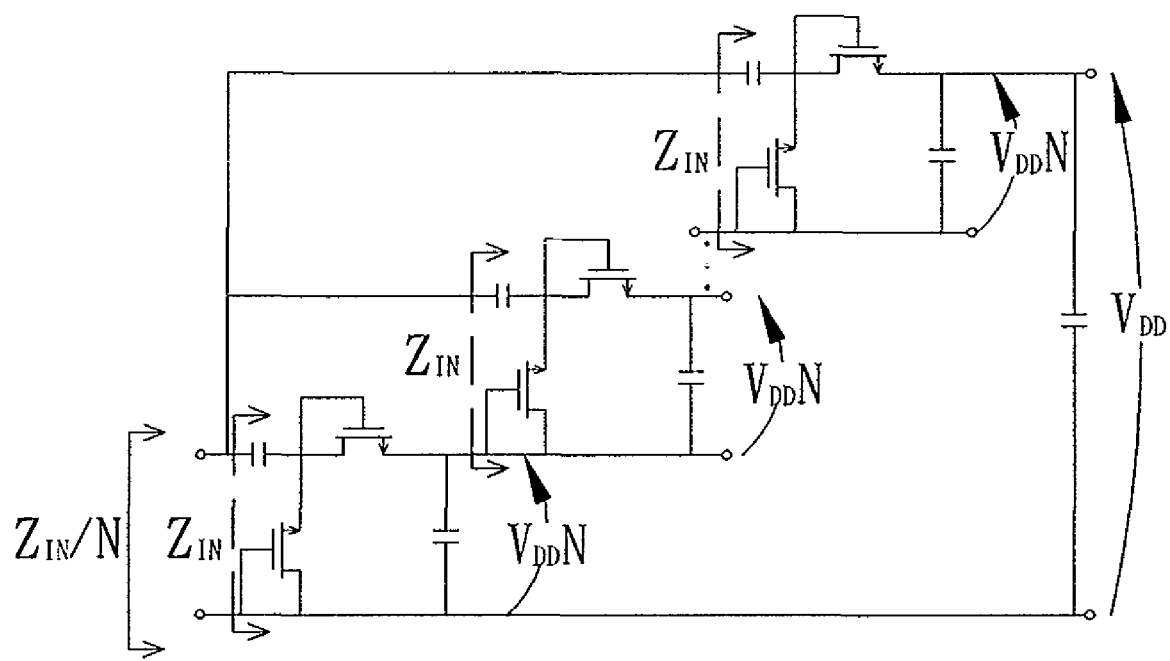
FIG. 2 illustrates a second conventional full-wave rectifying circuit structure.
Figure 3A:
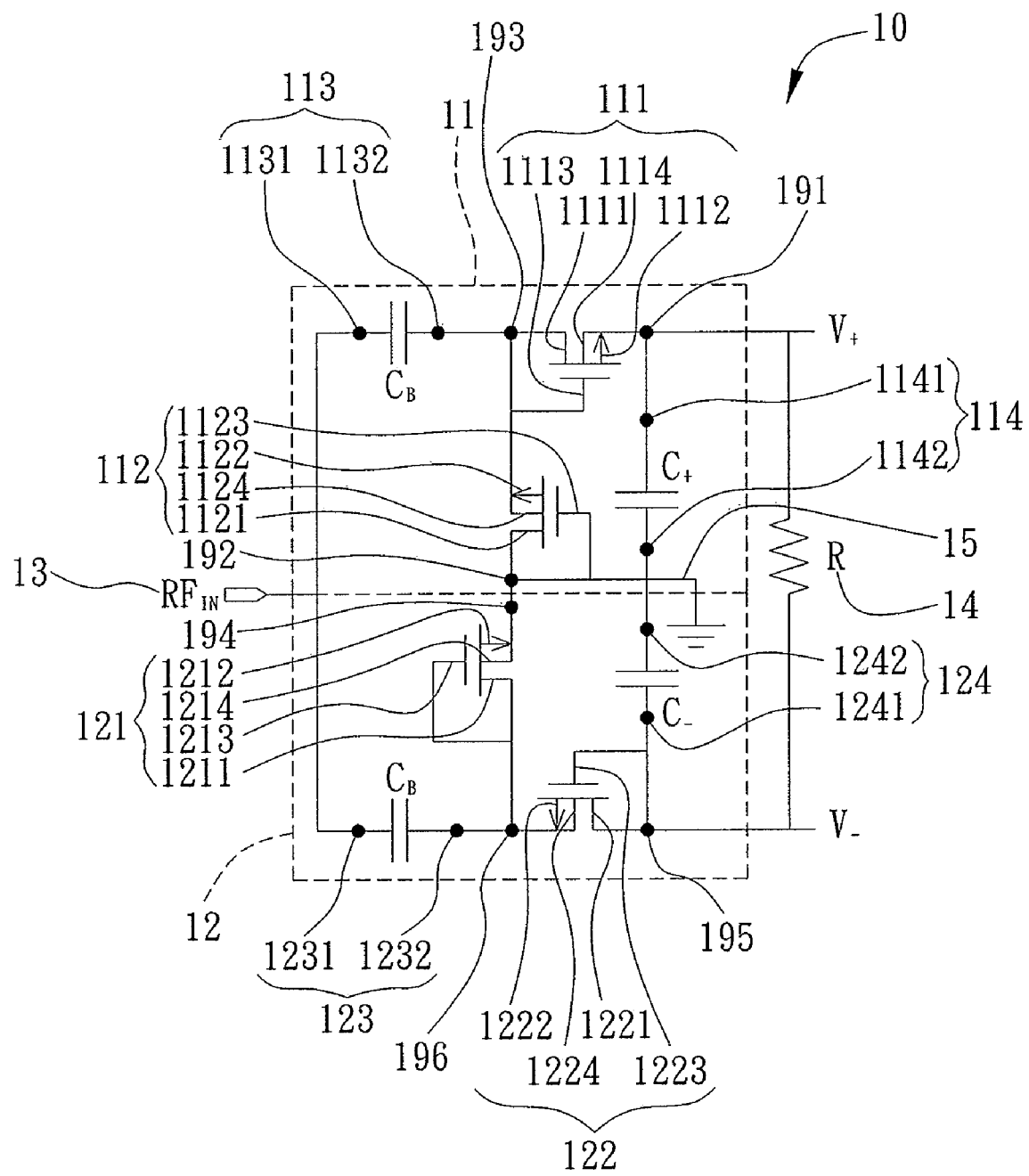
FIG. 3a is a circuit schematic according to a first embodiment of the present invention.

FIG. 3a illustrates a circuit according to a first embodiment of the present invention. As shown in the diagram, a full-wave rectifying device 10 of the present invention includes a first rectification unit 11 and a second rectification unit 12.

In particular, the first rectification unit 11 further has a first transistor 111 having a first drain 1111, a first source 1112, a first gate 1113, and a first substrate 1114; a second transistor 112 having a second drain 1121, a second source 1122, a second gate 1123 and a second substrate 1124; the first source 1112 is connected to the first substrate 1114 to form a first connection node 191; the second drain 1121 is connected to the second gate 1123 to form a second connection node 192; the first drain 1111, the first gate 1113, the second source 1122 and the second substrate 1124 are connected to one another to form a third connection node 193.

The second rectification unit 12 further includes a third transistor 121 having a third drain 1211, a third source 1212, a third gate 1213, and a third substrate 1214; a fourth transistor 122 having a fourth drain 1221, a fourth source 1222, a fourth gate 1223 and a fourth substrate 1224; the third source 1212 is connected to the third substrate 1214 to form a fourth connection node 194; the fourth drain 1221 is connected to the fourth gate 1223 to form a fifth connection node 195; the third drain 1211, the third gate 1213, the fourth source 1222 and the fourth substrate 1224 are connected to one another to form a sixth connection node 196.

Figure 3B:
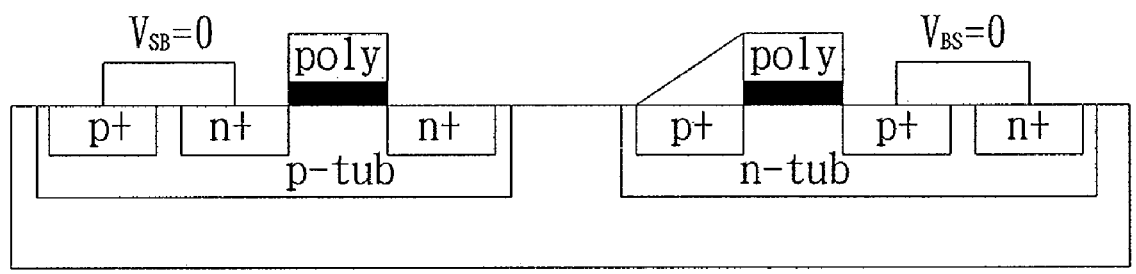
FIG. 3b is a diagram showing a connection of the source of a transistor and the substrate.

It is to be noted that the present invention adopts the transistor symbol of source-to-substrate connection in the TSMC twin-well process as shown in FIG. 3b.

The first rectification unit 11 further includes a first capacitor 113 having a first capacitor terminal 1131 and a second capacitor terminal 1132, and a second capacitor 114 having a third capacitor terminal 1141 and a fourth capacitor terminal 1142; the second rectification unit 12 further includes a third capacitor 123 having a fifth capacitor terminal 1231 and a sixth capacitor terminal 1232, and a fourth capacitor 124 having a seventh capacitor terminal 1241 and an eighth capacitor terminal 1242. The second capacitor terminal 1132 is connected to the third connection node 193; the third capacitor terminal 1141 is connected to the first connection node 191; the sixth capacitor terminal 1232 is connected to the sixth connection node 196; the seventh capacitor terminal 1241 is connected to the fifth connection node 195.

The full-wave rectifying device 10 also includes a signal input unit 13, a load 14, and a ground terminal 15. In particular, the signal input unit 13 is connected to the first capacitor terminal 1131 and the fifth capacitor terminal 1231. The load 14 is connected in series between the first connection node 191 and the fifth connection node 195. In addition, the second connection node 192, the fourth connection node 194, the fourth capacitor terminal 1142 and the eighth capacitor terminal 1242 are connected to the ground terminal 15.

Such an arrangement allows the signal input unit 13 to receive the RF signal, wherein a stable rectified dc voltage level is generated by the first rectification unit 11 and the second rectification unit 12. The rectified dc voltage is then presented between the first connection node 191 and the fifth connection node 195 as an output signal.

SECOND EMBODIMENT

Figure 4:
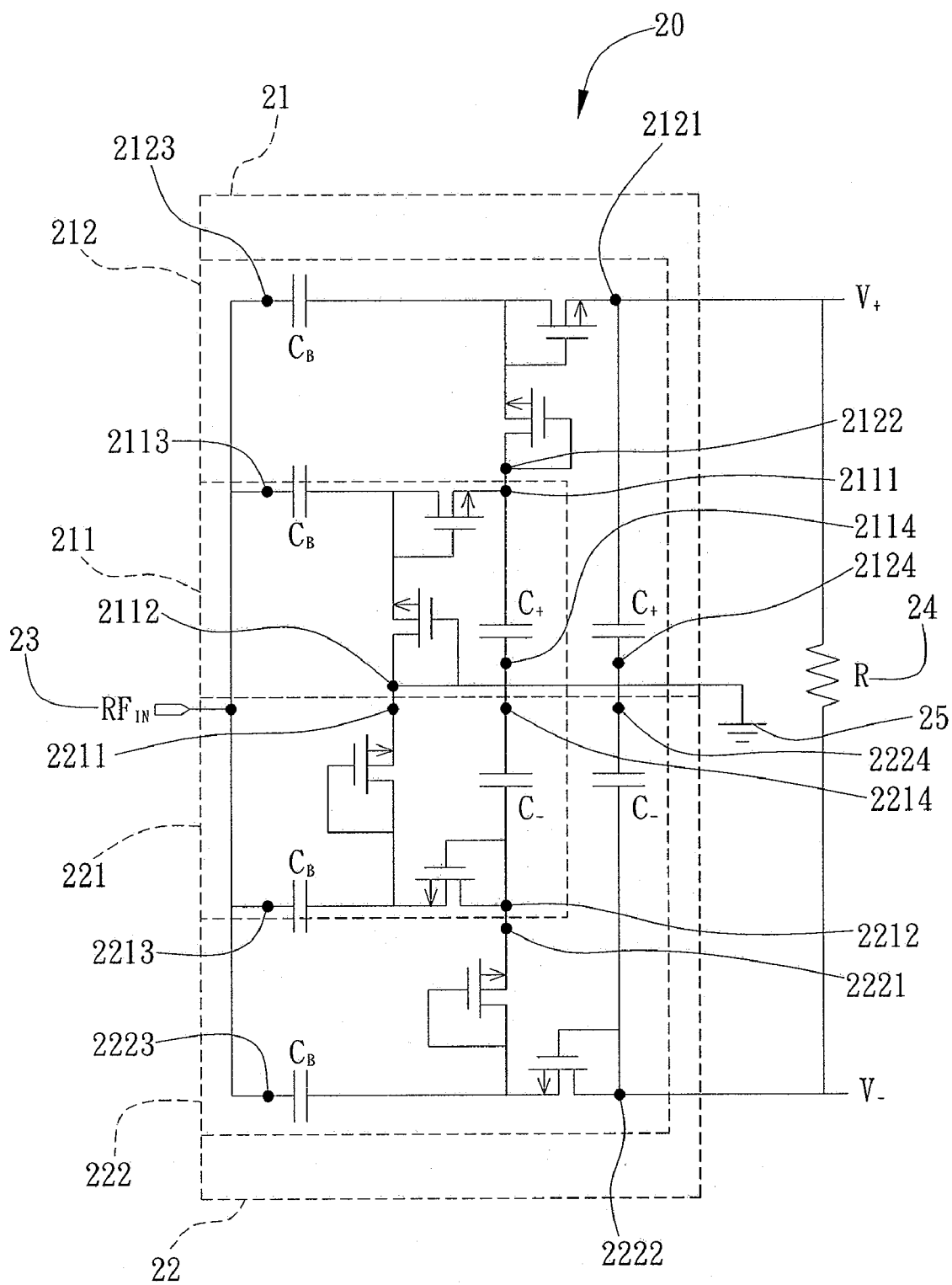
FIG. 4 is a circuit schematic according to a second embodiment of the present invention.

FIG. 4 illustrates a circuit schematic according to a second embodiment of the present invention. The present embodiment and the first embodiment have the same basic rectifying circuit concept. The only difference is that a rectification module composed of two rectification units is employed in the present embodiment in place of a single rectification unit.

As shown in the diagram, the full-wave rectifying device 20 of the present invention includes a first rectification module 21, a second rectification module 22, a signal input unit 23, a load 24 and a ground terminal 25, wherein the first rectification module 21 further includes a first first rectification unit 211 and a second first rectification unit 212; the second rectification module 22 has a first second rectification unit 221 and a second second rectification unit 222.

In particular, each of the first rectification units and each of the second rectification units according to the present invention have the same circuit structure as the first rectification unit 11 and the second rectification unit 12, respectively, described in the first embodiment. Besides, in the present embodiment, the first first rectification unit 211 has a first connection node 2111 and a second connection node 2112. The second first rectification unit 212 includes a first connection node 2121 and a second connection node 2122. Also the first second rectification unit 221 includes a fourth connection node 2211 and a fifth connection node 2212. The second second rectification unit 222 has a fourth connection node 2221 and a fifth connection node 2222.

In the present embodiment, the first first rectification unit 211 has a first capacitor terminal 2113 and a fourth capacitor terminal 2114; the second first rectification unit 212 includes a first capacitor terminal 2123 and a fourth capacitor terminal 2124. Also, the first second rectification unit 221 has a fifth capacitor terminal 2213 and an eighth capacitor terminal 2214; the second second rectification unit 222 includes a fifth capacitor terminal 2223 and an eighth capacitor terminal 2224.

In terms of the circuit structure, the second connection node 2122 of the second first rectification unit 212 is connected to the first connection node 2111 of the first first rectification unit 211. The fourth connection node 2221 of the second second rectification unit 222 is connected to the fifth connection node 2212 of the first second rectification unit 221. Subsequently, the second connection node 2112 of the first first rectification unit 211 and the fourth connection node 2211 of the first second rectification unit 221 are grounded.

Next, the first capacitor terminal 2113, the first capacitor terminal 2123, the fifth capacitor terminal 2213, and the fifth capacitor terminal 2223 are connected to the signal input unit 23; the fourth capacitor terminal 2114, the fourth capacitor terminal 2124, the eighth capacitor terminal 2214 and the eighth capacitor 2224 are connected to the ground terminal 25.

Finally, the first connection node 2121 of the second first rectification unit 212 and the fifth connection node 2222 of the second second rectification unit 222 are connected to the load 24, thereby forming a two-stage rectifying circuit structure.

Such an arrangement allows the signal input unit 23 to receive the RF signal, wherein a stable, rectified dc voltage level is generated by the first rectification module 21 and the second rectification module 22. The rectified dc voltage is increased to a sufficient level and then presented at the first connection node 2121 of the second first rectification unit 212 and the fifth connection node 2222 of the second second rectification unit 222 as an output signal.

THIRD EMBODIMENT

Figure 5:
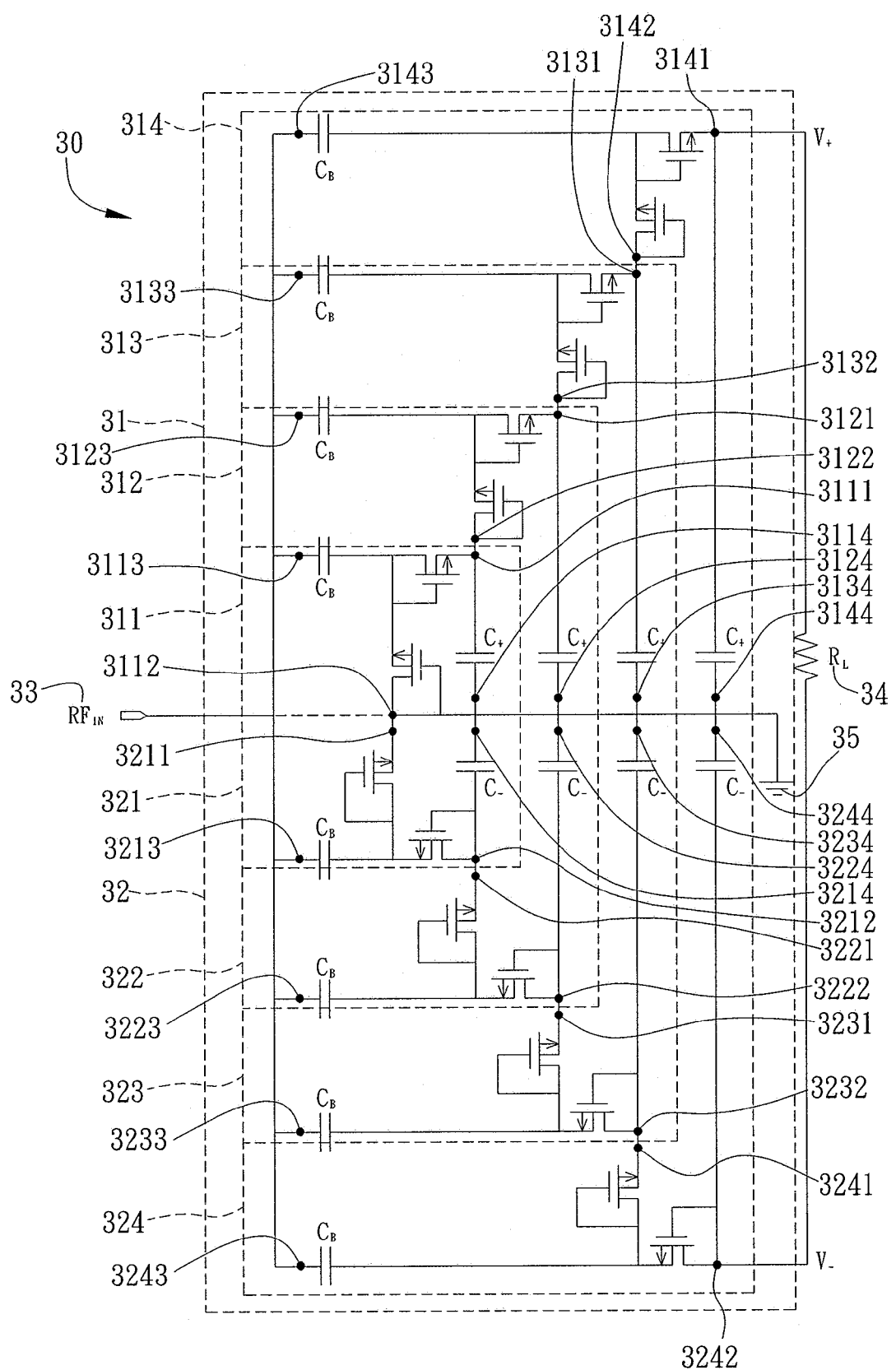
FIG. 5 is a circuit schematic according to a third embodiment of the present invention.
Figure 6:
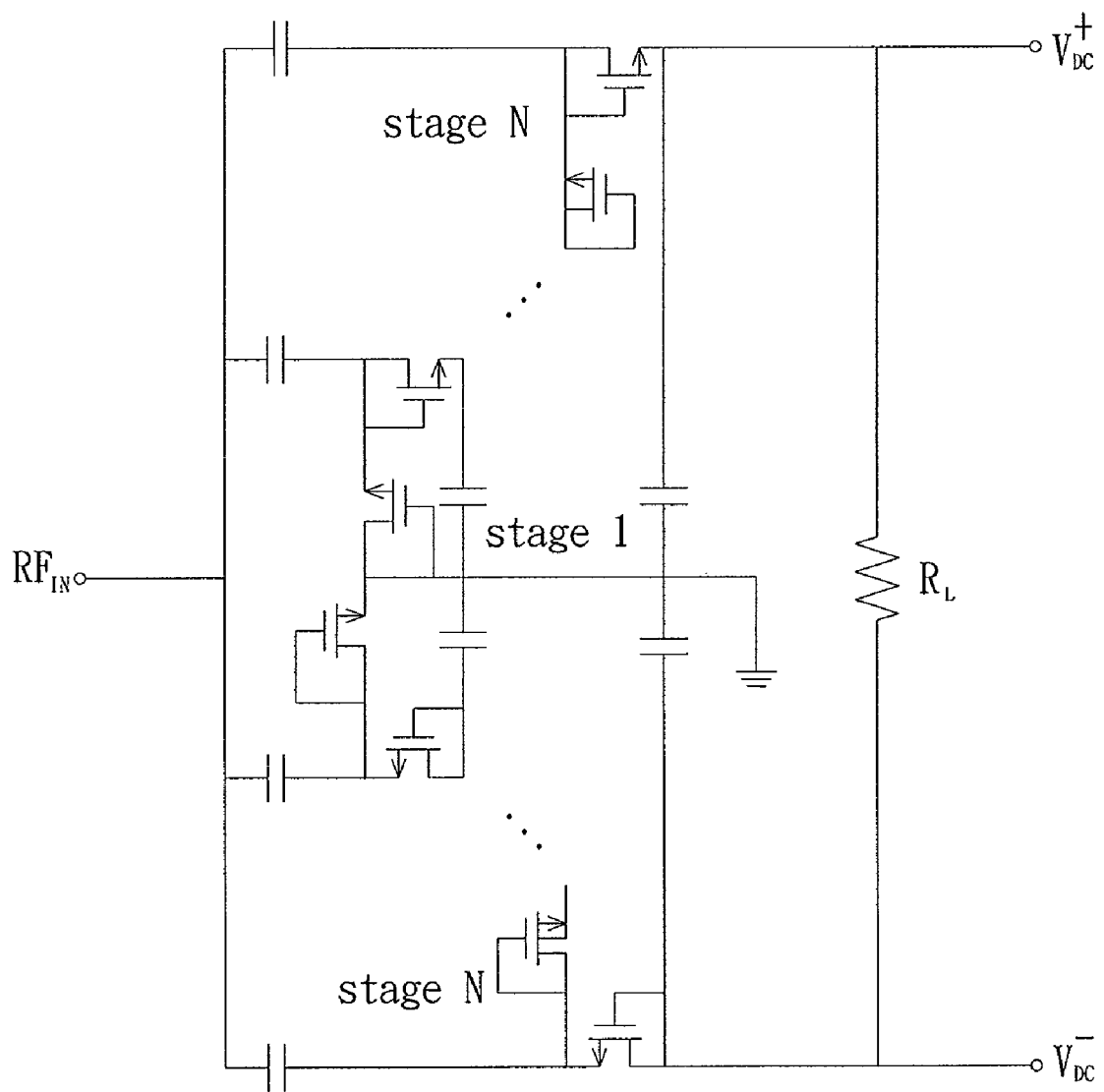
FIG. 6 is a circuit schematic of a symmetrical N-stage full-wave rectifying device according to the present invention.

FIG. 5 illustrates a circuit schematic according to a third embodiment of the present invention. The present embodiment has the same basic rectifying circuit concept as that of the first and the second embodiments. The only difference is that the present embodiment discloses a full-wave rectifying device that is allowed to be expanded arbitrarily, thereby forming an N-stage rectification module composed of N rectification units. In the present embodiment, N is a whole number that is greater than 2.

However, it is too complicated to list all N rectification units of the rectification module, thus the present embodiment describes the concept of the rectification module composed of N rectification units using the rectification module made up of 4 rectification units as an example. In situations where N is greater than 4, the rectification structure is expanded accordingly.

As shown in FIG. 5, the full-wave rectifying device 30 of the present invention includes a first rectification module 31, a second rectification module 32, a signal input unit 33, a load 34 and a ground terminal 35, wherein the first rectification module 31 further includes a first first rectification unit 311, a second first rectification unit 312, a third first rectification unit 313, and a fourth first rectification unit 314; the second rectification module 32 includes a first second rectification unit 321, a second second rectification unit 322, a third second rectification unit 323 and a fourth second rectification unit 324.

In particular, each of the first rectification units and each of the second rectification units according to the present invention have the same circuit structure as the first rectification unit 11 and the second rectification unit 12 described in the first embodiment. Besides, in the present embodiment, the first first rectification unit 311 has a first connection node 3111 and a second connection node 3112. The second first rectification unit 312 includes a first connection node 3121 and a second connection node 3122. The third first rectification unit 313 has a first connection node 3131 and a second connection node 3132. The fourth first rectification unit 314 includes a first connection node 3141 and a second connection node 3142.

The first first rectification unit 311 has a first capacitor terminal 3113 and a fourth capacitor terminal 3114; the second first rectification unit 312 includes a first capacitor terminal 3123 and a fourth capacitor terminal 3124; the third first rectification unit 313 has a first capacitor terminal 3133 and a fourth capacitor terminal 3134; the fourth first rectification unit 314 includes a first capacitor terminal 3143 and a fourth capacitor terminal 3144.

The first second rectification unit 321 has a fourth connection node 3211 and a fifth connection node 3212; the second second rectification unit 322 includes a fourth connection node 3221 and a fifth connection node 3222; the third second rectification unit 323 has a fourth connection node 3231 and a fifth connection node 3232; the fourth second rectification unit 324 has a fourth connection node 3241 and a fifth connection node 3242

The first second rectification unit 321 has a fifth capacitor terminal 3213 and an eighth capacitor terminal 3214; the second second rectification unit 322 includes a fifth capacitor terminal 3223 and an eighth capacitor terminal 3224. Also, the third second rectification unit 323 has a fifth capacitor terminal 3233 and an eighth capacitor terminal 3234; the fourth second rectification unit 324 includes a fifth capacitor terminal 3243 and an eighth capacitor terminal 3244.

In terms of the circuit structure, the second connection node 3122 of the second first rectification unit 312 is connected to the first connection node 3111 of the first first rectification unit 311. The second connection node 3132 of the third first rectification unit 313 is connected to the first connection node 3121 of the second first rectification unit 312. The second connection node 3142 of the fourth first rectification unit 314 is connected to the first connection node 3131 of the third first rectification unit 313.

The fourth connection node 3221 of the second second rectification unit 322 is connected to the fifth connection node 3212 of the first second rectification unit 321. The fourth connection node 3231 of the third second rectification unit 323 is connected to the fifth connection node 3222 of the second second rectification unit 322. The fourth connection node 3241 of the fourth second rectification unit 324 is connected to the fifth connection node 3232 of the third second rectification unit 323.

Finally, the second connection node 3112 of the first first rectification unit 311 and the fourth connection node 3211 of the first second rectification unit 321 are grounded to form a symmetrical four-stage full-wave rectifying circuit structure.

Based on the same concept and in the event that N rectification units are employed, it is concluded that the basic concept of such circuit connection involves connecting the second node of $N^{th}$ first rectification unit to the first node of the $(N-1)^{st}$ first rectification unit. In addition, the fourth connection node of the $N^{th}$ second rectification unit is connected to the fifth connection node of the $(N-1)^{st}$ second rectification unit. Finally, the second connection node of the first first rectification unit and the fourth connection node of the first second rectification unit are grounded, thereby forming a symmetrical N-stage full-wave rectifying circuit structure.

Next, the first capacitor terminal 3113, the first capacitor terminal 3123, the first capacitor terminal 3133, and the first capacitor terminal 3143 as well as the fifth capacitor terminal 3213, the fifth capacitor terminal 3223, the fifth capacitor terminal 3233 and the fifth capacitor terminal 3243 are connected to the signal input unit 33. Subsequently, the fourth capacitor terminal 3114, the fourth capacitor terminal 3124, the fourth capacitor terminal 3134, and the fourth capacitor terminal 3144 as well as the eighth capacitor terminal 3214, the eighth capacitor terminal 3224, the eighth capacitor terminal 3234 and the eighth capacitor terminal 3244 are connected to the ground terminal 35. Finally, the first connection node 3141 of the fourth first rectification unit 314 and the fifth connection node 3242 of the fourth second rectification unit 324 are connected to the load 34.

Such an arrangement allows the signal input unit 33 to receive the RF signal, wherein a stable, rectified dc voltage level is generated by the four-stage full-wave rectifying circuit composed of the first rectification module 31 and the second rectification module 32. The rectified dc voltage is increased to a sufficient level and then presented between the first connection node 3141 of the fourth first rectification unit 314 and the fifth connection node 3242 of the fourth second rectification unit 324 as an output signal.

Hence, based on the same concept and in the event that N rectification units are employed, the basic concept of such circuit connection is concluded as follows. The RF signal, after received by the signal input unit, is converted to a stable, rectified dc voltage by the N-stage full-wave rectifying circuit composed of the first rectification module and the second rectification module. The voltage is also increased to a sufficient level and then presented between the first connection node of the $N^{th}$ first rectification unit and the fifth connection node of the $N^{th}$ second rectification unit as an output signal.

In summary, the full-wave rectifying device of the present invention employs the method of connecting the source of each transistor to the substrate in order to effectively lower the body effect in the rectifying circuit. Next, a plurality of capacitors are used to generate a rectified dc voltage. Besides, the full-wave rectifying device of the present invention also discloses a multistage rectifying circuit design that employs a plurality of first rectification units and a plurality of second rectification units, so as to increase the rectified dc voltage to a sufficient level.

While the invention has been particularly shown and described with reference to preferred embodiments for purposes of illustration, it will be understood that variations and modifications can be effected thereto by those skilled in the art without departing from the spirit and scope of the invention as defined by the appended claims.

What is claimed is:

1. A full-wave rectifying device, comprising:
a first rectification module comprising two first rectification units, wherein each of the first rectification units comprises: a first transistor comprising a first drain, a first source, a first gate and a first substrate, and a second transistor comprising a second drain, a second source, a second gate and a second substrate, the first source being connected to the first substrate to form a first connection node, the second drain being connected to the second gate to form a second connection node, and the first drain, the first gate, the second source and the second substrate being connected to one another to form a third connection node; and
a second rectification module comprising two second rectification units, wherein each of the second rectification units comprises a third transistor comprising a third drain, a third source, a third gate and a third substrate, and a fourth transistor comprising a fourth drain, a fourth source, a fourth gate and a fourth substrate, the third source being connected to the third substrate to form a fourth connection node, the fourth drain being connected to the fourth gate to form a fifth connection node, and the third drain, the third gate, the fourth source and the fourth substrate being connected to one another to form a sixth connection node;
wherein the second connection node of the second first rectification unit is connected to the first connection node of the first first rectification unit, and the fourth connection node of the second second rectification unit is connected to the fifth connection node of the first second rectification unit.

2. The full-wave rectifying device of claim 1, wherein each of the first rectification units further comprises a first capacitor having a first capacitor terminal and a second capacitor terminal and a second capacitor having a third capacitor terminal and a fourth capacitor terminal, and each of the second rectification units further comprises a third capacitor having a fifth capacitor terminal and a sixth capacitor terminal and a fourth capacitor having a seventh capacitor terminal and an eighth capacitor terminal.

3. The full-wave rectifying device of claim 2, wherein the second capacitor terminal of each of the first rectification units is connected to the third connection node thereof, the third capacitor terminal of each of the first rectification units is connected to the first connection node thereof, the sixth capacitor terminal of each of the second rectification units is connected to the sixth connection node thereof, the seventh capacitor terminal of each of the second rectification units is connected to the fifth connection node thereof.

4. The full-wave rectifying device of claim 3, wherein the second connection node of the first first rectification unit and the fourth connection node of the first second rectification unit are grounded, and the fourth capacitor terminal of each of the first rectification units and the eighth capacitor terminal of each of the second rectification units are grounded.

5. The full-wave rectifying device of claim 4 further comprising a signal input unit connected each of the first capacitor terminals and each of the fifth capacitor terminals for feeding RF signals into the first rectification module and the second rectification module.

6. The full-wave rectifying device of claim 5, wherein the RF signals are first rectified by the first and second rectification modules, and then outputted through the first connection node of the second first rectification unit and the fifth connection node of the second second rectification unit.

7. The full-wave rectifying device of claim 4 further comprising a load connected in series between the first connection node of the second first rectification unit and the fifth connection node of the second second rectification unit.

8. A full-wave rectifying device, comprising:
 a first rectification module comprising N first rectification units, wherein each of the first rectification units comprises: a first transistor comprising a first drain, a first source, a first gate and a first substrate, and a second transistor comprising a second drain, a second source, a second gate and a second substrate, the first source being connected to the first substrate to form a first connection node, the second drain being connected to the second gate to form a second connection node, and the first drain, the first gate, the second source and the second substrate being connected to one another to form a third connection node; and
 a second rectification module comprising N second rectification units, wherein each of the second rectification units comprises: a third transistor comprising a third drain, a third source, a third gate and a third substrate, and a fourth transistor comprising a fourth drain, a fourth source, a fourth gate and a fourth substrate, the third source being connected to the third substrate to form a fourth connection node, the fourth drain being connected to the fourth gate to form a fifth connection node, and the third drain, the third gate, the fourth source and the fourth substrate being connected to one another to form a sixth connection node;
 wherein N is a positive integer greater than 3, the second connection node of the Nth first rectification unit is connected to the first connection node of the (N−1)st first rectification unit, and the fourth connection node of the Nth second rectification unit is connected to the fifth connection node of the (N−1)st second rectification unit.

9. The full-wave rectifying device of claim 8, wherein each of the first rectification units further comprises a first capacitor having a first capacitor terminal and a second capacitor terminal and a second capacitor having a third capacitor terminal and a fourth capacitor terminal, and each of the second rectification units further comprises a third capacitor having a fifth capacitor terminal and a sixth capacitor terminal and a fourth capacitor having a seventh capacitor terminal and an eighth capacitor terminal.

10. The full-wave rectifying device of claim 9, wherein the second capacitor terminal of each of the first rectification units is connected to the third connection node thereof, the third capacitor terminal of each of the first rectification units is connected to the first connection node thereof, the sixth capacitor terminal of each of the second rectification units is connected to the sixth connection node thereof, and the seventh capacitor terminal of each of the second rectification units is connected to the fifth connection node thereof.

11. The full-wave rectifying device of claim 10, wherein the second connection node of the first first rectification unit and the fourth connection node of the first second rectification unit are grounded, and the fourth capacitor terminal of each of the first rectification units and the eighth capacitor terminal of each of the second rectification units are grounded.

12. The full-wave rectifying device of claim 11 further comprising a signal input unit connected each of the first capacitor terminals and each of the fifth capacitor terminals for feeding RF signals into the first rectification module and the second rectification module.

13. The full-wave rectifying device of claim 12, wherein the RF signals are first rectified by the first and second rectification modules, and then outputted through the first connection node of the $N^{th}$ first rectification unit and the fifth connection node of the $N^{th}$ second rectification unit.

14. The full-wave rectifying device of claim 11 further comprising a load connected in series between the first connection node of the $N^{th}$ first rectification unit and the fifth connection node of the $N^{th}$ second rectification unit.

* * * * *